US009885384B2

(12) United States Patent
Futae et al.

(10) Patent No.: US 9,885,384 B2
(45) Date of Patent: Feb. 6, 2018

(54) FLOATING BUSH BEARING DEVICE AND SUPERCHARGER INCLUDING THE SAME

(71) Applicant: MITSUBISHI HEAVY INDUSTRIES, LTD., Tokyo (JP)

(72) Inventors: Takaya Futae, Tokyo (JP); Hiroshi Kanki, Tokyo (JP); Noriyuki Hayashi, Tokyo (JP); Hideaki Nishida, Tokyo (JP); Shinji Ogawa, Tokyo (JP); Chiaki Yasuda, Hiroshima (JP); Yutaka Ozawa, Takasago (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 315 days.

(21) Appl. No.: 14/650,811

(22) PCT Filed: Dec. 19, 2012

(86) PCT No.: PCT/JP2012/082893
§ 371 (c)(1),
(2) Date: Jun. 9, 2015

(87) PCT Pub. No.: WO2014/097417
PCT Pub. Date: Jun. 26, 2014

(65) Prior Publication Data
US 2015/0330442 A1 Nov. 19, 2015

(51) Int. Cl.
*F04D 29/046* (2006.01)
*F16C 17/02* (2006.01)
(Continued)

(52) U.S. Cl.
CPC .......... *F16C 17/028* (2013.01); *F01D 25/166* (2013.01); *F01D 25/186* (2013.01);
(Continued)

(58) Field of Classification Search
CPC .... F01D 25/186; F01D 25/166; F04D 29/057; F04D 29/063; F04D 29/284;
(Continued)

(56) References Cited

U.S. PATENT DOCUMENTS 1,674,453 A * 6/1928 Sloper ..................... F16C 17/18
384/292
4,358,253 A * 11/1982 Okano ................... F01D 25/166
384/368
(Continued)

FOREIGN PATENT DOCUMENTS

CN 1080371 A 1/1994
DE 2906167 A1 8/1980
(Continued)

OTHER PUBLICATIONS

International Preliminary Report on Patentability (Forms PCT/IB/338, PCT/IB/373 and PCT/IB/326), dated Jul. 2, 2015, for International Application No. PCT/JP2012/082893.
(Continued)

*Primary Examiner* — Ninh H Nguyen
(74) *Attorney, Agent, or Firm* — Birch, Stewart, Kolasch & Birch, LLP

(57) ABSTRACT

An object is to provide a floating bush bearing device with excellent oscillation stability and small bearing loss. A floating bush bearing device which rotatably supports a rotation shaft includes: a bearing housing, a floating bush rotatably disposed between the rotation shaft and an inner circumferential surface of the bearing housing, in the bearing housing, and a bush side oil supply hole which is formed through the floating bush and is capable of supplying lubricating oil between the rotation shaft and the inner circumferential surface of the floating bush, the inner circumferential surface of the floating bush has a non-circular shape so that a gap portion is formed between the rotation
(Continued)

shaft and the inner circumferential surface of the floating bush, the gap portion having a predetermined clearance or larger regardless of relative positions of the rotation shaft and the inner circumferential surface of the floating bush, and the bush side oil supply hole communicates with the gap portion.

20 Claims, 9 Drawing Sheets

(51) Int. Cl.

| | | |
|---|---|---|
| *F16C 33/10* | (2006.01) | |
| *F04D 29/056* | (2006.01) | |
| *F04D 29/053* | (2006.01) | |
| *F04D 17/10* | (2006.01) | |
| *F04D 29/28* | (2006.01) | |
| *F01D 25/16* | (2006.01) | |
| *F01D 25/18* | (2006.01) | |
| *F16C 17/18* | (2006.01) | |

(52) U.S. Cl.
CPC .......... *F04D 17/10* (2013.01); *F04D 29/053* (2013.01); *F04D 29/056* (2013.01); *F04D 29/284* (2013.01); *F16C 17/18* (2013.01); *F16C 33/1045* (2013.01); *F16C 33/1075* (2013.01); *F16C 33/1085* (2013.01); *F05D 2260/98* (2013.01)

(58) Field of Classification Search
CPC ...... F04D 29/056; F16C 17/028; F16C 17/18; F16C 33/1045; F16C 33/1075; F16C 33/1085; F05D 2240/53; F05D 2260/89
See application file for complete search history.

(56) References Cited

U.S. PATENT DOCUMENTS

| | | | | |
|---|---|---|---|---|
| 4,602,873 | A * | 7/1986 | Izumi ................ | F16C 27/02 384/115 |
| 7,429,132 | B1 | 9/2008 | Marussich | |
| 8,646,979 | B2 * | 2/2014 | Kashchenevsky ...... | F16C 32/06 384/114 |
| 2010/0166347 | A1 | 7/2010 | Wendling | |
| 2014/0010647 | A1 | 1/2014 | Nishida et al. | |

FOREIGN PATENT DOCUMENTS

| | | |
|---|---|---|
| DE | 3936069 A1 | 5/1991 |
| EP | 0 856 673 A2 | 8/1998 |
| FR | 2316861 A1 | 12/1988 |
| JP | 48-9852 B1 | 3/1973 |
| JP | 58-142014 A | 8/1983 |
| JP | 62-106122 A | 5/1987 |
| JP | 63-63023 A | 2/1988 |
| JP | 64-48425 U | 3/1989 |
| JP | 1-193409 A | 8/1989 |
| JP | 2000-145781 A | 5/2000 |
| JP | 2001-173659 A | 6/2001 |
| JP | 2003-166524 A | 6/2003 |
| JP | 2009-7935 A | 1/2009 |
| JP | 2009-167872 A | 7/2009 |
| JP | 2010-43680 A | 2/2010 |
| JP | 2011-236923 A | 11/2011 |
| JP | 2012-72908 A | 4/2012 |
| JP | 2012-207584 A | 10/2012 |
| WO | WO 2012/132586 A1 | 10/2012 |

OTHER PUBLICATIONS

International Search Report and Written Opinion of the International Searching Authority (Forms PCT/ISA/220, PCT/ISA/237 and PCT/ISA/210), dated Feb. 19, 2013, for International Application No. PCT/JP2012/082893, with an English translation of the Written Opinion.

Japanese Notice of Allowance, dated Mar. 13, 2015, for Japanese Application No. 2014-501362, with an English translation.

Japanese Office Action, dated Apr. 1, 2014, for Japanese Application No. 2014-501362, with an English translation.

Japanese Office Action, dated Aug. 1, 2014, for Japanese Application No. 2014-501362, with an English translation.

Notice of Allowance effective Nov. 4, 2016, issued to the corresponding EP Application No. 12890467.9.

Chinese Office Action effective Aug. 2, 2016 issued in corresponding Chinese Application No. 201280077265.0 with an English Translation.

Extended European Search Report effective Oct. 30, 2015 issued to the corresponding EP Application No. 12890467.9.

Extended European Search Report for European Application No. 16174154.1, dated Oct. 13, 2016.

* cited by examiner

FLOATING BUSH BEARING DEVICE AND SUPERCHARGER INCLUDING THE SAME

TECHNICAL FIELD

The present invention relates to a floating bush bearing device which rotatably supports a rotation shaft and a supercharger including the floating bush bearing device.

BACKGROUND

A floating bush bearing device has been known which is formed by rotatably disposing a floating bush between a bearing housing and a rotation shaft in a bearing device rotatably supporting the rotation shaft (for example, see Patent Document 1). In the floating bush bearing device, an oil film is formed by supplying lubricating oil into a clearance between the bearing housing and the floating bush, and into a clearance between the floating bush and the rotation shaft. The rotation shaft is rotatably supported by the oil film formed in the clearances.

CITATION LIST

Patent Literature

Patent Document 1: Japanese Patent Application Laid-Open No. 2012-207584

SUMMARY

Technical Problem

In a conventional floating bush bearing device, inner and outer circumferential surfaces of the rotation shaft and the floating bush as well as an inner circumferential surface of the bearing housing each have a circular lateral cross-sectional shape. The present inventors have found out that asynchronous oscillation, not in synchronization with the rotation of the rotation shaft, is likely to occur in such a conventional floating bush bearing device. The asynchronous oscillation is particularly likely to occur in a small supercharger mounted in an automobile engine for example.

At least one embodiment of the present invention is made in view of the problem in the conventional device described above, and an object of the present invention is to provide a floating bush bearing device with excellent oscillation stability and small bearing loss, and a supercharger including the floating bush bearing device.

Solution to Problem

To achieve the object described above, at least one embodiment of the present invention provides a floating bush bearing device which rotatably supports a rotation shaft, the floating bush bearing device including: a bearing housing, a floating bush rotatably disposed between the rotation shaft and an inner circumferential surface of the bearing housing, in the bearing housing, and a bush side oil supply hole which is formed through the floating bush and is capable of supplying lubricating oil between the rotation shaft and the inner circumferential surface of the floating bush. The inner circumferential surface of the floating bush has a non-circular shape so that a gap portion is formed between the rotation shaft and the inner circumferential surface of the floating bush, larger regardless of relative positions of the rotation shaft and the inner circumferential surface of the floating bush, a clearance formed by the gap portion being different depending on the relative positions of the rotation shaft and the inner circumferential surface of the floating bush. The bush side oil supply hole communicates with the gap portion.

In such a floating bush bearing device, the inner circumferential surface of the floating bush has the non-circular shape, so that the clearance between the inner circumferential surface of the floating bush and the rotation shaft is non-uniform in the circumference direction is formed regardless of relative positions of the rotation shaft and the inner circumferential surface of the floating bush. Thus, a cross section is reduced with respect to a bearing dynamic characteristic direct section, whereby the oscillation stability of the bearing device can be improved. Furthermore, a larger average clearance between the rotation shaft and the inner circumferential surface of the floating bush can be achieved, whereby a bearing loss can be reduced compared with a case where the inner circumferential surface of the floating bush has a perfect circle shape.

The bush side oil supply hole is in communication with the gap portion, whereby higher oil supply characteristics on the inner side of the floating bush can be achieved, the oscillation stability can be improved, and the bearing loss can be reduced.

In one embodiment of the present invention, the inner circumferential surface of the floating bush has a multi-arc shape, formed by combining a plurality of arcs with different center points, or has an elliptical shape.

In such a configuration, the inner circumferential surface of the floating bush described above can geometrically easily be formed to have a non-circular shape. Furthermore, for example, the clearance between the rotation shaft and the inner circumferential surface of the floating bush can be more gently changed, compared with a case where the inner circumferential surface of the floating bush has recesses and protrusions.

In one embodiment of the present invention, recess portions, having different areas, are respectively formed on a load direction side of the rotation shaft and a side opposite to the load direction side, in the inner circumferential surface of the bearing housing, and one of the recess portions with a larger area communicates with a housing side oil supply hole which is formed through the bearing housing and is capable of supplying lubricating oil between an outer circumferential surface of the floating bush and the inner circumferential surface of the bearing housing.

In such a configuration, the housing side oil supply hole is in communication with the recess portion having a larger area, whereby the floating bush is pushed toward the floating bush having a smaller area due to the difference between the two recess portions in the oil supply pressure (oil supply pressure=oil pressure×area). As a result, even higher eccentricity ratio of the floating bush can be achieved, whereby the oscillation stability of the bearing can be improved.

The recess portions are respectively formed on the load direction side of the rotation shaft and the side opposite to the load direction side. Thus, the first recess portion and the second recess portion each function as an oil reservoir, whereby higher oil supply characteristics on the inner side of the floating bush can be achieved.

In one embodiment of the present invention, an oil groove is formed in the inner circumferential surface of the bearing housing, the oil groove connecting between the two recess portions respectively formed on the load direction side of the rotation shaft and the side opposite to the load direction side.

In such a configuration, the lubricating oil can be further supplied into the second recess portion, which is not in communication with the housing side oil supply hole, through the oil groove, whereby higher oil supply characteristics on the inner side of the floating bush can be achieved.

In one embodiment of the present invention, the housing side oil supply hole communicates with a first recess portion formed on the side opposite to the load direction side of the rotation shaft in the inner circumferential surface of the bearing housing.

In such a configuration, the housing side oil supply hole is in communication with the first recess portion formed on the side opposite to the load direction side of the rotation shaft. Thus, the rotation shaft is further pushed in the load direction thereof due to the above-described difference between the first recess portion and the second recess portion in the oil supply pressure. As a result, even higher eccentricity ratio of the floating bush can be achieved, whereby the oscillation stability of the bearing can be improved.

In one embodiment of the present invention, the housing side oil supply hole communicates with a second recess portion on the load direction side of the rotation shaft in the inner circumferential surface of the bearing housing.

In such a configuration, the housing side oil supply hole is in communication with the second recess portion formed on the load direction side of the rotation shaft, whereby floating of the floating bush can be easily achieved, and the startability can be improved.

In one embodiment of the present invention, a circumference direction groove, extending along a circumference direction, is formed in the outer circumferential surface of the floating bush.

In such a configuration, a friction torque on the outer circumferential surface of the floating bush is reduced, so that the rotation speed of the floating bush increases, whereby the bearing loss on the inner side of the floating bush can be reduced. The circumference direction groove provides a squeezing effect to achieve higher reduction effect of the lubricating oil. All things considered, the oscillation stability is improved.

In one embodiment of the present invention, a plurality of partial grooves are formed in the outer circumferential surface of the floating bush, and the bush side oil supply hole communicates with the partial holes.

In such a configuration, the higher oil supply characteristics on the inner side of the floating bush can be achieved, the oscillation stability can be improved, and the bearing loss can be reduced.

In one embodiment of the present invention, the partial grooves have a V shape in a plan view formed by two groove portions intersecting with each other, each of two groove portions extending in different directions inclined with respect to an axial direction, and which have an opening side on a rotation direction side of the floating bush, and the bush side oil supply hole communicates with an intersecting portion between the two groove portions.

In such a configuration, the bush side oil supply hole is in communication with the intersecting portion between the two groove portions where the lubricating oil is easily collected. Thus, even higher oil supply characteristics on the inner side of the floating bush can be achieved.

A supercharger according to at least one embodiment of the present invention includes: a rotation shaft; a compressor rotor coupled to one end portion of the rotation shaft; and the floating bush bearing device which rotatably supports the rotation shaft according to any one of the embodiments.

Thus, the supercharger including the floating bush bearing device with excellent oscillation stability and small bearing loss can be formed.

Advantageous Effects

With at least one embodiment of the present invention, a floating bush bearing device with excellent oscillation stability and small bearing loss, and a supercharger including the floating bush bearing device can be provided.

DETAILED DESCRIPTION

Embodiments of the present invention are described in detail with reference to the drawings. It is intended, however, that the scope of the present invention is not limited to the embodiments described above. Dimensions, materials, shapes, relative positions, and the like of components described in the embodiments shall be interpreted as illustrative only and not limitative of the scope of the present invention unless otherwise specified.

Figure 1:
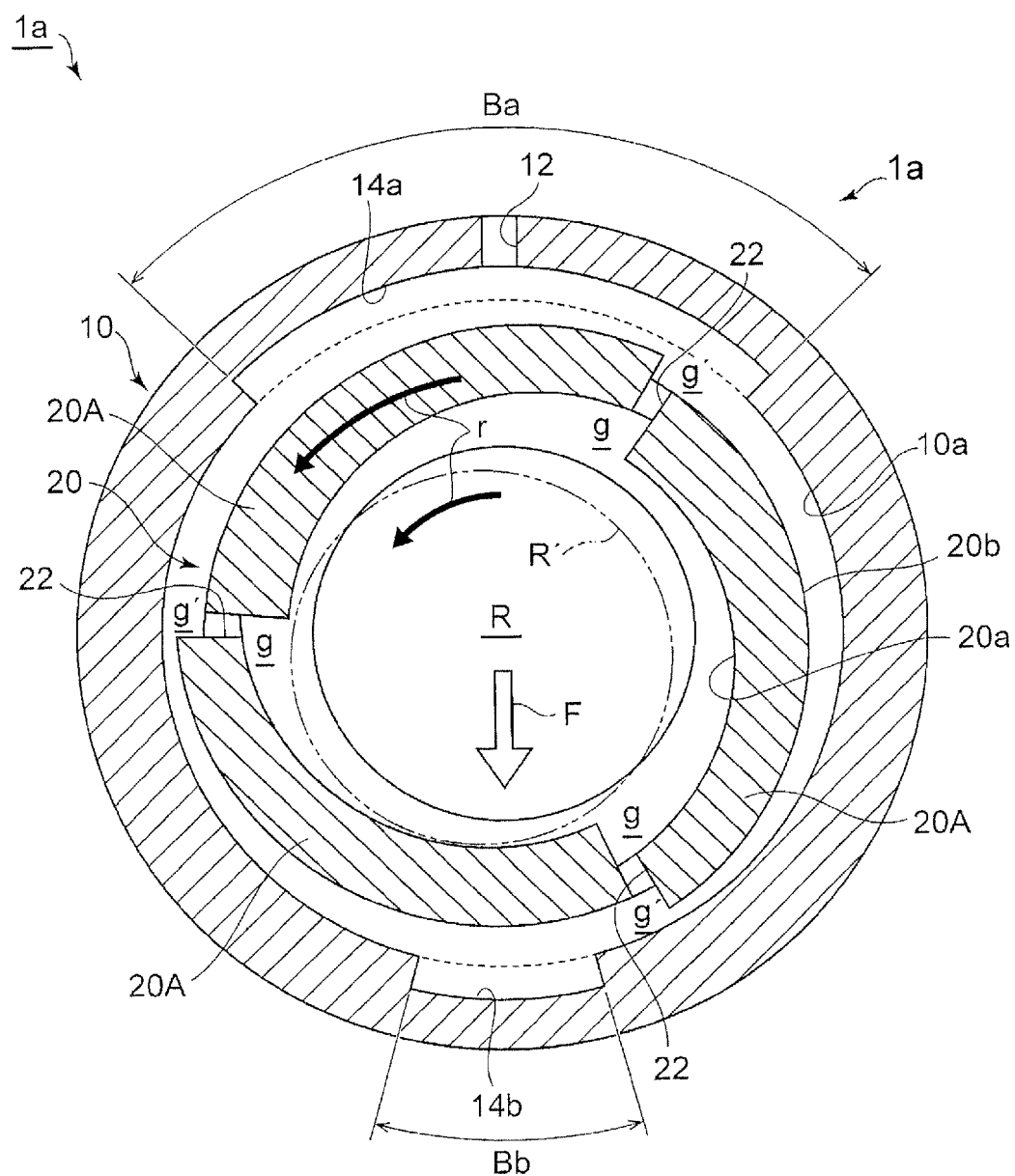
FIG. 1 is a cross-sectional view of a floating bush bearing device according to an embodiment of the present invention.

FIG. 1 is a cross-sectional view of a floating bush bearing device according to an embodiment of the present invention. A floating bush bearing device 1a according to the present embodiment includes a bearing housing 10 and a floating bush 20 as shown in FIG. 1, and rotatably supports a rotation shaft R.

The bearing housing 10 has a cylindrical cross-sectional shape as shown in FIG. 1, and has a first recess portion 14a formed at an upper side position in the figure, and a second recess portion 14b formed at a position in an inner circumferential surface 10a on the opposite side of the first recess portion 14a in a circumference direction. The first recess portion 14a and the second recess portion 14b are different from each other in area. In the bearing housing 10 of the present embodiment, the first recess portion 14a has a larger area. An arrow F in the figure indicates a load direction of the rotation shaft R. The second recess portion 14b is formed at a portion of the inner circumferential surface 10a of the bearing housing on a side of a load direction F.

Figure 2A:
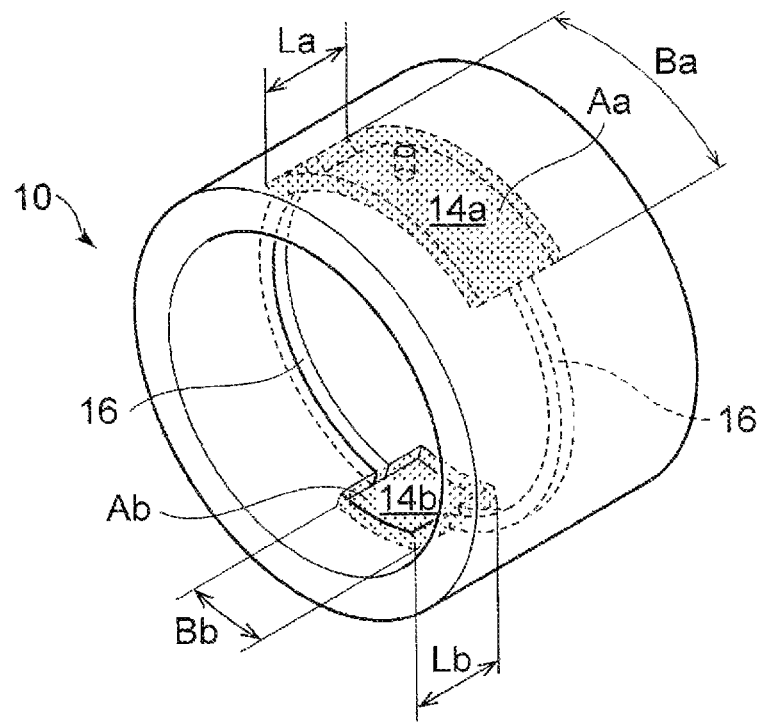
FIGS. 2A and 2B are diagrams for schematically illustrating a recess portion formed in an inner circumferential surface of a bearing housing.

As shown in FIG. 2A, in the bearing housing 10 shown in FIG. 1, a width Ba of the first recess portion 14a is larger than a width Bb of the second recess portion 14b. A length La of the first recess portion 14a is the same as a length Lb of the second recess portion 14b. Thus, an area Aa of the first recess portion 14a is larger than an area Ab of the second recess portion 14b.

Figure 2B:
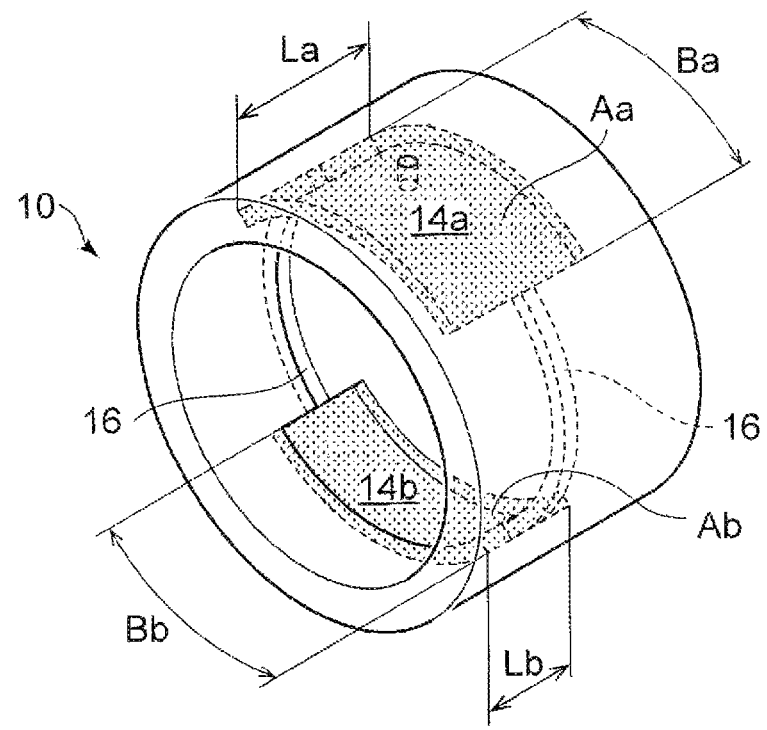

Alternatively, as shown in FIG. 2B, Ba and Bb may be the same when La>Lb holds true so that the first recess portion 14a has a larger area.

As shown in FIGS. 2A and 2B, the first recess portion 14a and the second recess portion 14b are connected to each other through an oil groove 16 which extends in a circumference direction and is formed in the inner circumferential surface 10a of the bearing housing.

As shown in FIG. 1, a housing side oil supply hole 12 extending in a radial direction is formed through the bearing housing 10. Pressurized lubricating oil is supplied between an outer circumferential surface 20b of the floating bush 20 and the inner circumferential surface 10a of the bearing housing 10 through the housing side oil supply hole 12, whereby an oil film is formed between the outer circumferential surface 20b and the inner circumferential surface 10a.

The housing side oil supply hole 12 is in communication with the first recess portion 14a with a larger area, and the lubricating oil is supplied to the second recess portion 14b through the oil groove 16 described above and the clearance between the inner circumferential surface 10a and the outer circumferential surface 20a of the floating bush. Thus, an oil pressure at the first recess portion 14a is higher than an oil pressure at the second recess portion 14b. As described above, the first recess portion 14a has a larger area than the second recess portion 14b. Thus, an oil supply pressure for pushing down the floating bush 20 by the first recess portion 14a (the oil pressure at the first recess portion 14a×the area of the first recess portion 14a) is larger than an oil supply pressure for pushing up the floating bush 20 by the second recess portion 14b (the oil pressure at the second recess portion 14b×the area of the second recess portion 14b).

As shown in FIG. 1, the floating bush 20 is disposed between the rotation shaft R and the inner circumferential surface 10a of the bearing housing 10 in the bearing housing 10. The floating bush 20 is disposed in the bearing housing 10 to be rotatable in a direction indicated by an arrow r in FIG. 1, together with the rotation shaft R.

As shown in FIG. 1, the floating bush 20 has a multi-arc shape formed by combining three arc portions 20A having the inner circumferential surfaces 20a with different center points. A gap portion g between the rotation shaft is formed between the rotation shaft R and an inner circumferential surface 20a of the floating bush 20 regardless of the relative positions between the rotation shaft R and the inner circumferential surface 20a of the floating bush 20, that is, even when the rotation shaft R, having a circular cross-sectional shape, moves in the floating bush 20, as illustrated in a two-dotted dashed line in the figure. A clearance formed by the gap portion being different depending on the relative positions of the rotation shaft and the inner circumferential surface of the floating bush.

As shown in FIG. 1, a bush side oil supply hole 22, extending in the radial direction, is formed through the floating bush 20, and is in communication with the gap portion g described above. The lubricating oil, supplied into the clearance between the outer circumferential surface 20b of the floating bush and the inner circumferential surface 10a of the bearing housing, is further supplied into the clearance between the rotation shaft R and the inner circumferential surface 20a of the floating bush through a bush side oil supply hole 2. Thus, the oil film is formed in the clearances. The bush side oil supply hole 22 is in communication with the gap portion g as described above, whereby the lubricating oil is stably supplied to the inner side of the floating bush 20 regardless of the position of the rotation shaft R.

As shown in FIG. 1, the three arc portions 20A have the outer circumferential surfaces 20b with different center points. A gap portion g' is formed regardless of the position of the floating bush 20, is formed between the inner circumferential surface 10a of the bearing housing 10 and the outer circumferential surface 20b of the floating bush 20. The bush side oil supply hole 22 described above is in communication with the gap portion g'. Thus, the lubricating oil is stably supplied to the inner side of the floating bush 20 regardless of the position of the floating bush 20.

As described above, in the floating bush bearing device 1a according to the present embodiment having the configuration described above, the inner circumferential surfaces 20a of the floating bush 20 define a non-circular shape with the multi-arc shape. Thus, the clearance between the inner circumferential surface 20a of the floating bush 20 and the rotation shaft R is non-uniform in the circumference direction, and the gap portion g, having the predetermined clearance or larger regardless of the relative positions between the inner circumferential surface 20a of the floating bush 20 and the rotation shaft R, is formed. Thus, a cross section is reduced with respect to a bearing dynamic characteristic direct section, whereby the oscillation stability of the bearing device can be improved. Furthermore, a larger average clearance between the rotation shaft R and the inner circumferential surface 20a of the floating bush 20 can be achieved, whereby a bearing loss can be reduced compared with a case where the inner circumferential surface 20a of the floating bush has a perfect circle shape.

As described above, the bush side oil supply hole 22 is in communication with the gap portion g. Thus, the oil supply characteristics on the inner side of the floating bush 20 can be improved, whereby the oscillation stability can be improved and furthermore, the bearing loss can be reduced.

As described above, the housing side oil supply hole 12 is in communication with the first recess portion 14a having a larger area. Thus, the floating bush 20 is pushed toward the second recess portion 14b, due to the difference between the two recess portions of the first recess portion 14a and the second recess portion 14b in the oil supply pressure. As a result, a higher eccentricity ratio of the floating bush 20 is achieved, whereby higher oscillation stability can be achieved.

As described above, the recess portions are respectively formed on a load direction side of the rotation shaft R and the side opposite to the load direction side. Thus, the first recess portion 14a and the second recess portion 14b each function as an oil reservoir, whereby higher oil supply characteristics on the inner side of the floating bush 20 can be achieved.

As described above, the first recess portion 14a and the second recess portion 14b are connected to each other through the oil groove 16. Thus, the lubricating oil can be further supplied into the second recess portion 14b, which is not in communication with the housing side oil supply hole 12, through the oil groove 16, whereby higher oil supply characteristics on the inner side of the floating bush 20 can be achieved.

In the embodiment described above, the housing side oil supply hole 12 is in communication with the first recess portion 14a, which is formed on the opposite side of the side of the load direction F of the rotation shaft R. Thus, the rotation shaft R is further pushed in the load direction F thereof due to the above-described difference between the first recess portion 14a and the second recess portion 14b in the oil supply pressure. As a result, even higher eccentricity ratio of the floating bush 20 can be achieved, whereby the oscillation stability of the bearing can be improved.

Figure 3:
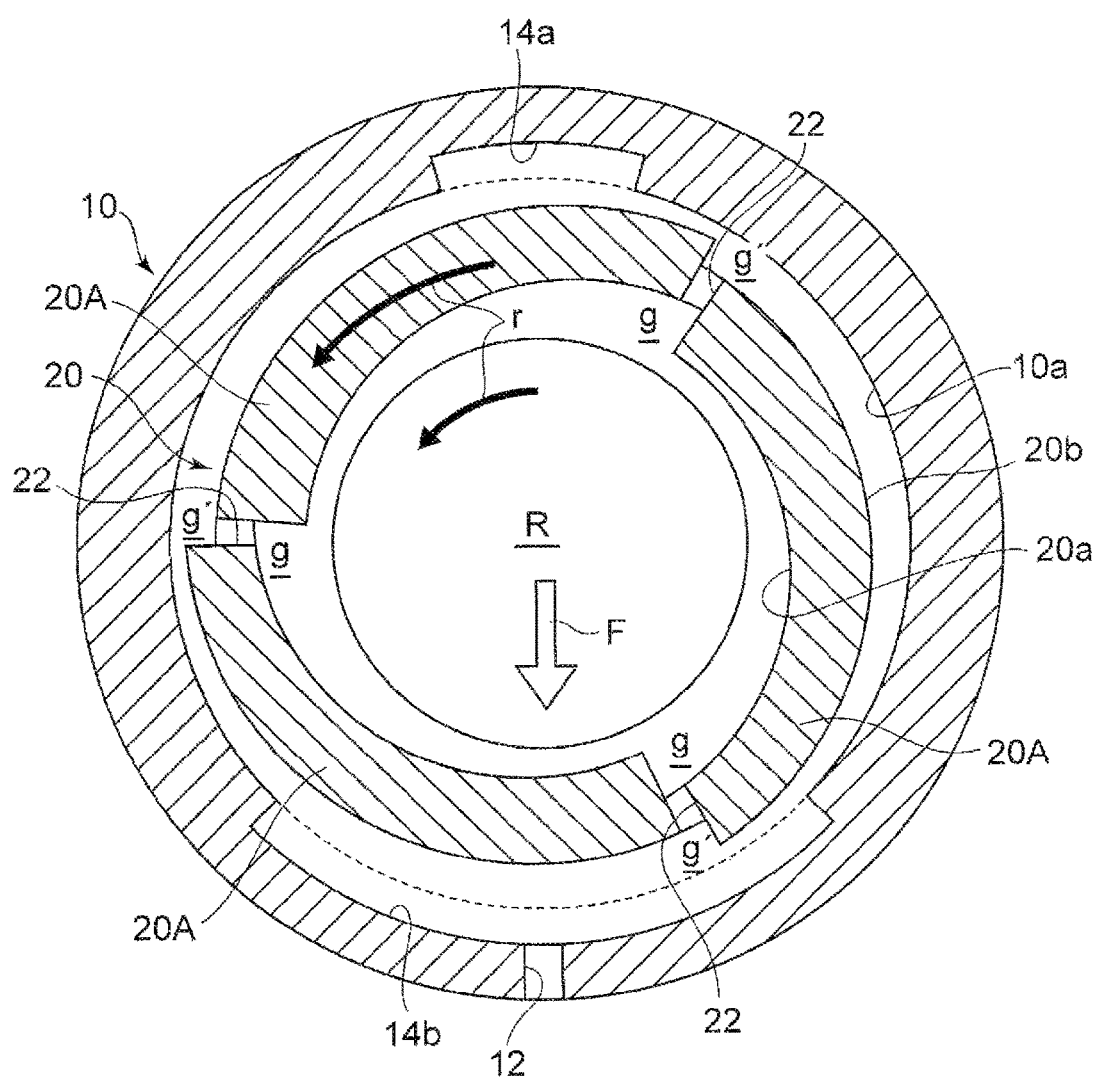
FIG. 3 is a cross-sectional view of a modification of the floating bush bearing device according to the embodiment of the present invention.

On the other hand, the housing side oil supply hole 12 may be in communication with the second recess portion 14b formed on the side of the load direction F of the rotation shaft R as in a floating bush bearing device 1b shown in FIG. 3. In this configuration in which the housing side oil supply hole 12 is in communication with the second recess portion 14b on the side of the load direction F of the rotation shaft R, floating of the floating bush 20 is achieved by the pressurized lubricating oil supplied from the housing side oil supply hole 12. Thus, the oil film is swiftly formed in the clearance between the inner circumferential surface 10a of the bearing housing 10 and the outer circumferential surface 20b of the floating bush 20, whereby the bearing loss at the time of the rotation start can be reduced and the startability can be improved.

Figure 4:
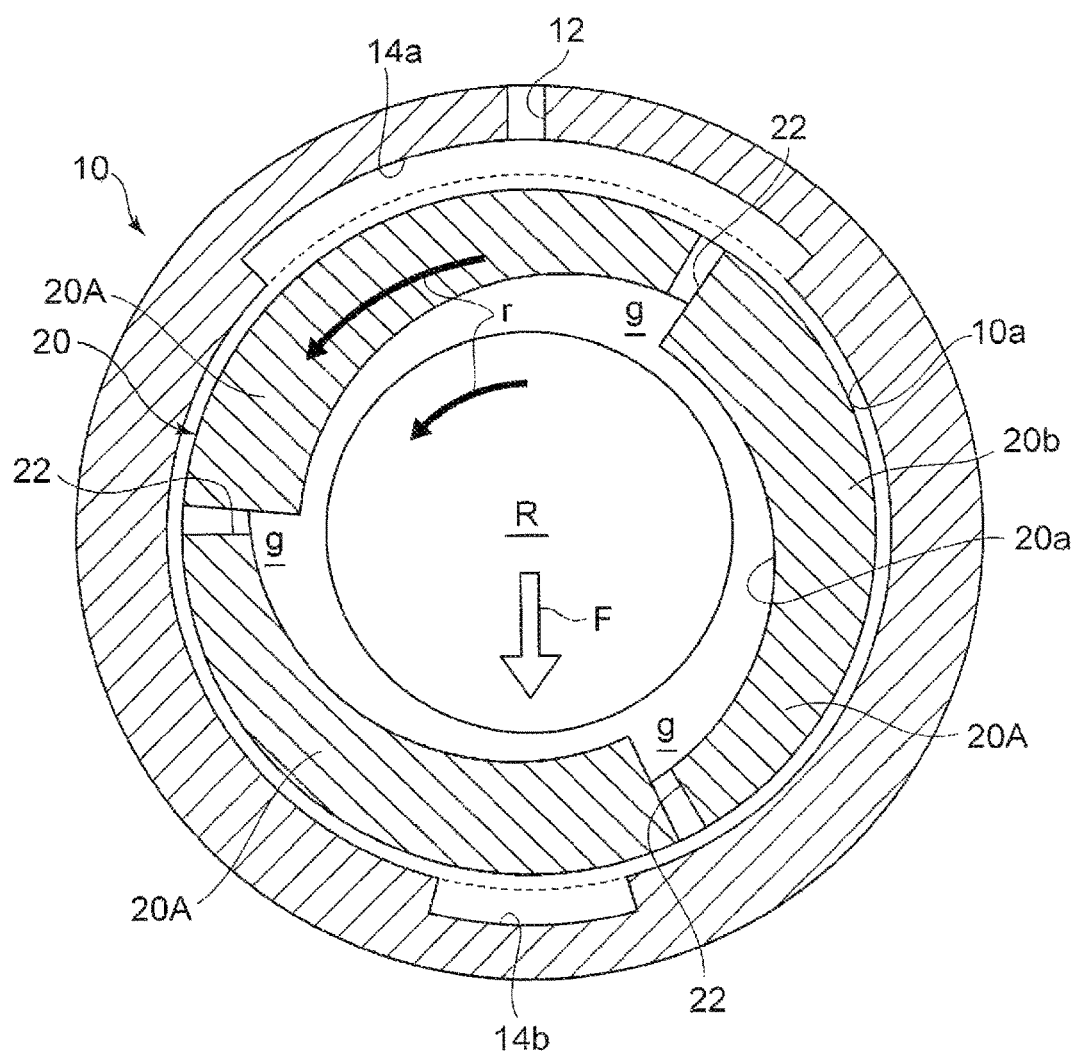
FIG. 4 is a cross-sectional view of a modification of the floating bush bearing device according to the embodiment of the present invention.

In the embodiment described above, the clearance between the inner circumferential surface 10a of the bearing housing 10 and the outer circumferential surface 20b of the floating bush 20 is non-uniform in the circumference direction, and the gap portion g' is formed in the clearance between the inner circumferential surface 10a of the bearing housing 10 and the outer circumferential surface 20b of the floating bush 20. However, the floating bush bearing device 1 according to the present invention is not limited to this. The clearance between the inner circumferential surface 10a of the bearing housing 10 and the outer circumferential surface 20b of the floating bush 20 may be uniform in the circumference direction as in a floating bush bearing device 1c illustrated in FIG. 4, as long as the clearance between the rotation shaft R and the inner circumferential surface 20a of the floating bush 20 is non-uniform, and the gap portion g is formed in the clearance between rotation shaft R and the inner circumferential surface 20a of the floating bush 20.

Figure 5:
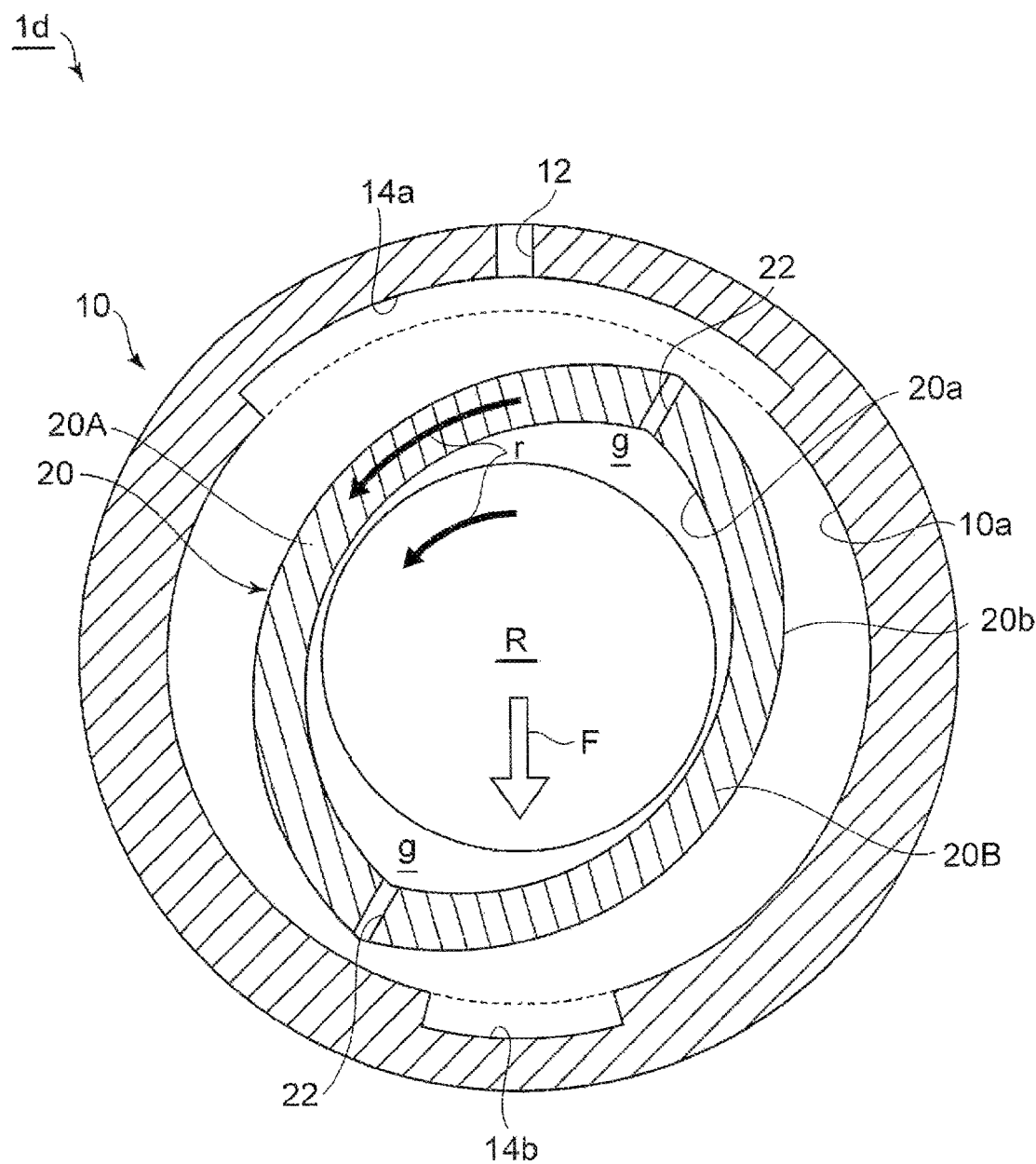
FIG. 5 is a cross-sectional view of a modification of the floating bush bearing device according to the embodiment of the present invention.
Figure 6:
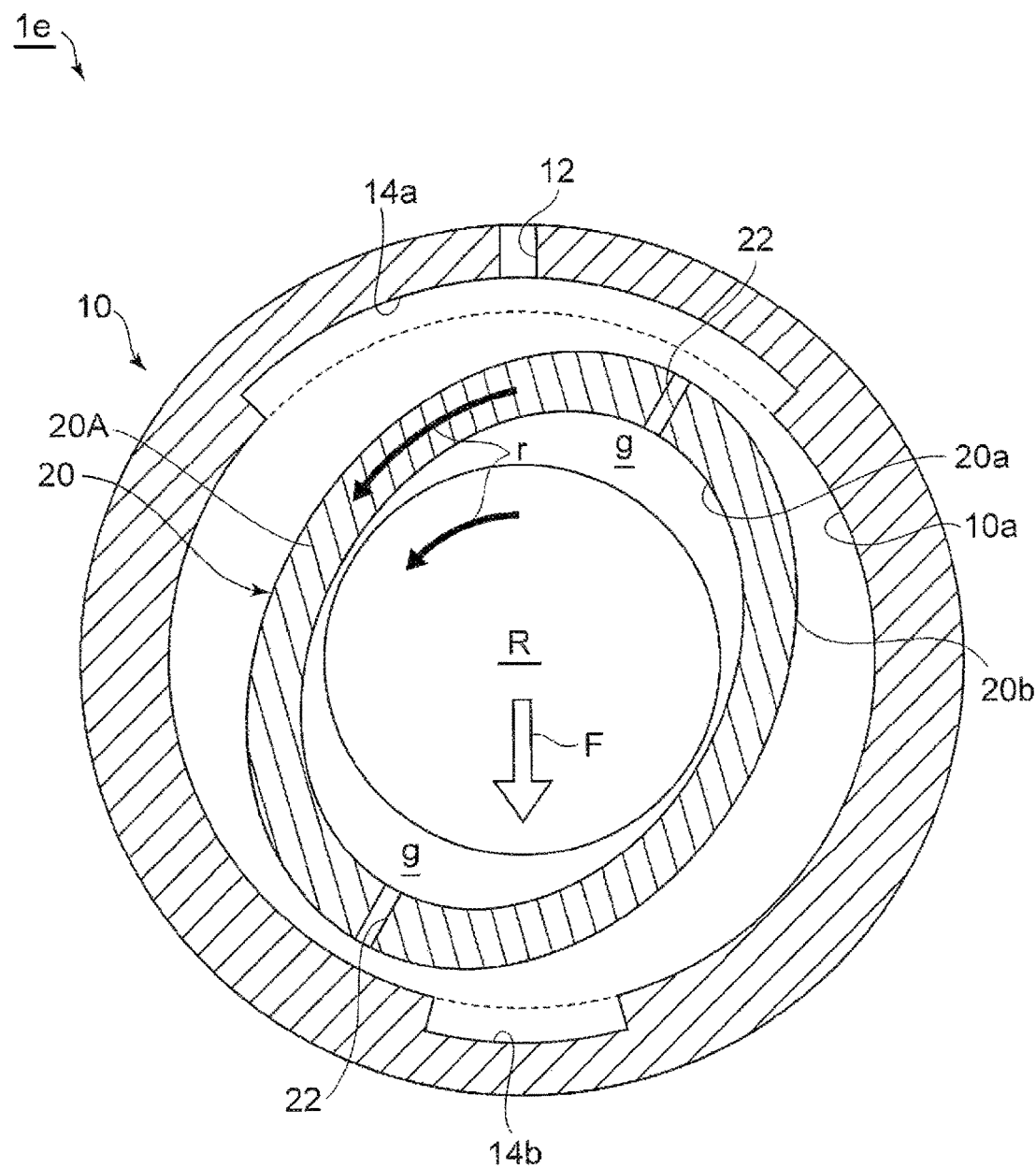
FIG. 6 is a cross-sectional view of a modification of the floating bush bearing device according to the embodiment of the present invention.

In the embodiment described above, the floating bush 20 has the multi-arc shape formed by combining the three arc portions 20A having the inner circumferential surfaces 20a with different center points. However, the floating bush bearing device 1 according to the present invention is not limited to this. Any number of arc portions may be combined as appropriate. The number of the arc portions to be combined is preferably two to five for the sake of productivity. FIG. 5 shows an example of a floating bush bearing device 1d including the floating bush 20 formed by combining two arc portions 20B having the inner circumferential surfaces 20a with different center points. The inner circumferential surface 20a of the floating bush 20 may have an elliptical shape, as in a floating bush bearing device 1e shown in FIG. 6.

In such a configuration, the inner circumferential surface 20a of the floating bush 20 described above can geometrically easily be formed to have a non-circular shape. Furthermore, for example, the clearance between the rotation shaft R and the inner circumferential surface 20a of the floating bush 20 can be more gently changed, compared with a case where the inner circumferential surface 20a of the floating bush 20 has recesses and protrusions.

Figure 7:
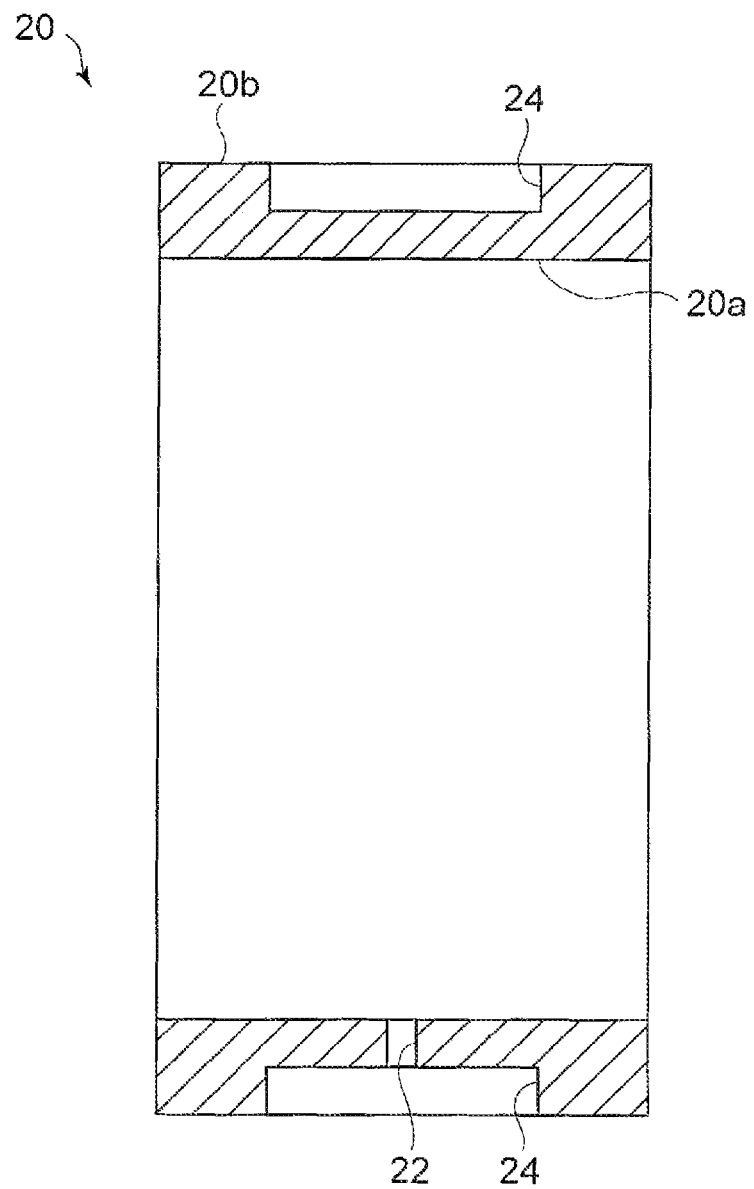
FIG. 7 is a vertical cross-sectional view of a floating bush of a floating bush according to an embodiment of the present invention.

FIG. 7 is a vertical cross-sectional view of a floating bush of a floating bush according to an embodiment of the present invention. The floating bush 20 according to the present embodiment has basically the same configuration as the floating bush 20 in the embodiment described above. The same components are denoted with the same reference numerals and the detail description thereof will be omitted.

In the floating bush 20 according to the present embodiment, a circumference direction groove 24 is formed along the circumference direction in the outer circumferential surface 20b as shown in FIG. 7. Preferably, the circumference direction groove 24 is formed over the entire circumference of the outer circumferential surface 20b. However, there may be a portion where the circumference direction groove 24 is not formed in the circumference direction. The number of the circumference direction grooves 24 is not particularly limited. In the example shown in FIG. 7, a single circumference direction groove 24 is continuously formed over the entire circumference of the outer circumferential surface 20b of the floating bush 20 for example.

Such a circumference direction groove 24 can reduce a friction torque on the outer circumferential surface 20b of the floating bush 20 so that the rotation speed of the floating bush 20 increases, whereby the bearing loss on the inner side of the floating bush 20 can be reduced. The circumference direction groove 24 provides a squeezing effect to achieve higher reduction effect of the lubricating oil. All things considered, the oscillation stability is improved.

As shown in FIG. 7, the bush side oil supply hole 22 described above may be in communication with the circumference direction groove 24. Thus, the oil supply characteristics on the inner side of the floating bush 20 can be improved, the oscillation stability can be improved and the bearing loss can be reduced.

Figure 8:
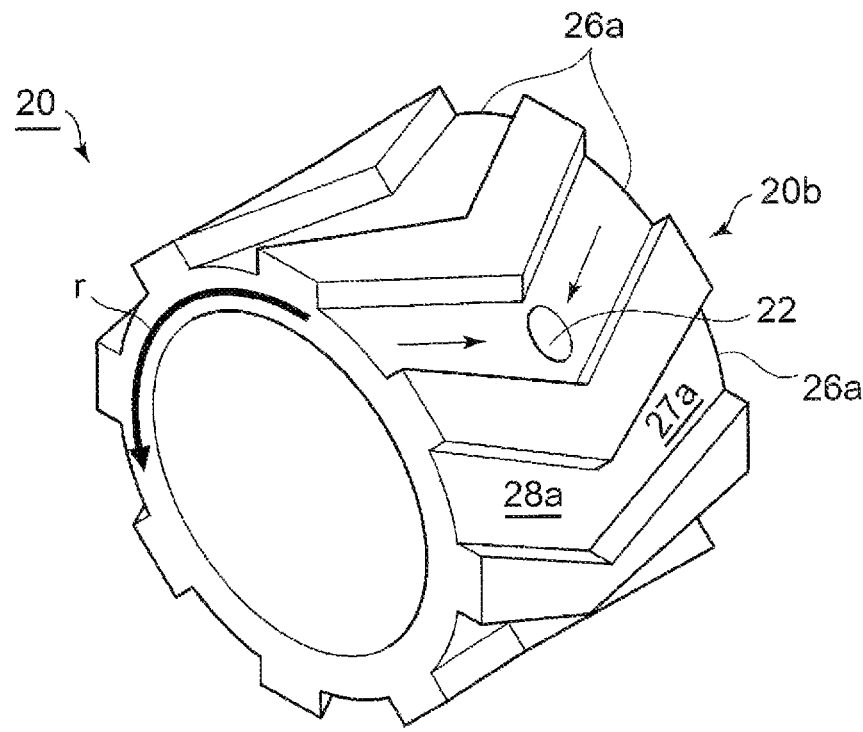
FIG. 8 is an outer view of a floating bush according to an embodiment of the present invention.

FIG. 8 is an outer view of a floating bush according to an embodiment of the present invention. The floating bush 20 according to the present embodiment has basically the same configuration as the floating bush 20 in the embodiments described above. The same components are denoted with the same reference numerals and the detail description thereof will be omitted.

As shown in FIG. 8, in the floating bush 20 according to the present embodiment, a plurality of partial grooves 26a are formed in the outer circumferential surface 20b. The partial groove 26a has a V shape in a plan view formed by two groove portions 27a and 28a, extending in different directions inclined with respect to an axial direction, intersecting with each other. The partial groove 26a has an opening side of a V shape on the rotation direction side in the rotation direction r of the floating bush 20. The bush side oil supply hole 22 described above is in communication with the intersecting portion between the two groove portions 27a and 28a.

In such a configuration, the lubricating oil can be easily collected in the intersecting portion through the groove portions 27a and 28a, when the floating bush 20 rotates. The bush side oil supply hole 22 is in communication with the intersecting portion in which the lubricating oil is easily collected. Thus, even higher oil supply characteristics on the inner side of the floating bush 20 can be achieved.

The embodiment of the partial groove 26 is not limited to the embodiment of the partial groove 26a shown in FIG. 8.

Figure 9:
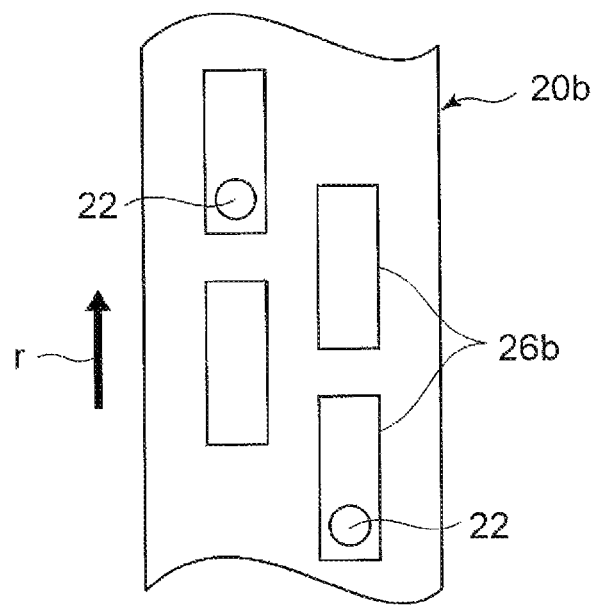
FIG. 9 is a diagram illustrating a modification of the floating bush illustrated in FIG. 8

For example, as shown in FIG. 9, an embodiment where elongated partial grooves 26b have a longitudinal direction extending along the circumference direction, and may form a staggered pattern may be employed. Here, as shown in FIG. 9, the bush side oil supply hole 22 is in communication with the elongated partial groove 26b at a position on an opposite side of the rotation direction r of the floating bush 20. Thus, the lubricating oil can be easily collected in the bush side oil supply hole 22 when the floating bush 20 rotates, whereby even higher oil supply characteristics on the inner side of the floating bush 20 can be achieved.

Figure 10:
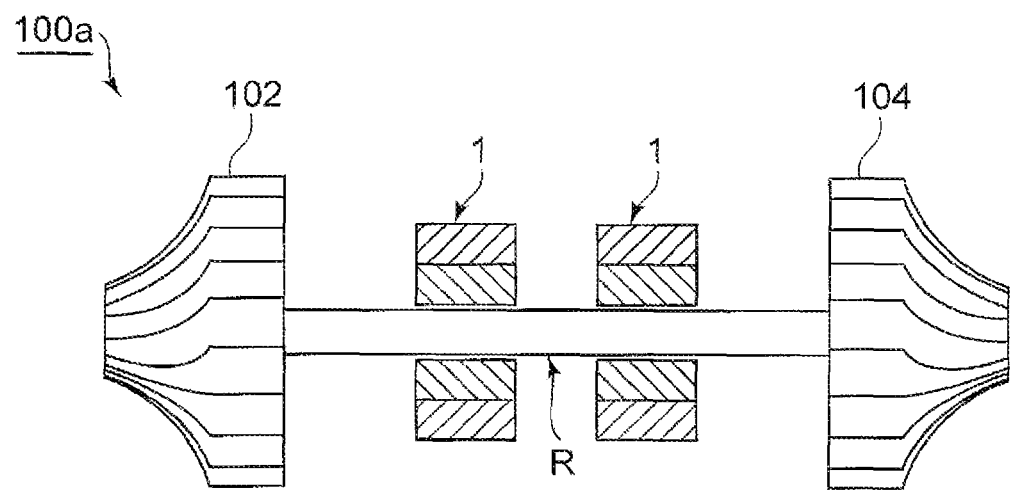
FIG. 10 is a schematic view of an embodiment of a supercharger including the floating bush bearing device according to the present invention.

FIG. 10 is a schematic view of an embodiment of a supercharger including the floating bush bearing device according to the present invention. As shown in FIG. 10, a supercharger 100 according to the present embodiment is formed as a turbocharger 100a including the rotation shaft R, a compressor rotor 102 and a turbine rotor 104 that are respectively coupled to both end portions of the rotation shaft R, and the floating bush bearing device 1 described above rotatably supports the rotation shaft R.

The compressor rotor 102 is disposed in an intake path of an engine, and the turbine rotor 104 is disposed in an exhaust path of the engine. The turbine rotor 104 is rotated by exhaust gas from the engine, and the compressor rotor 102 is coaxially operated in response to the rotation. Thus, air flowing in the intake path is compressed, whereby turbocharged air is supplied to the engine.

In such a configuration, the turbocharger 100a including the floating bush bearing device with excellent oscillation stability and small bearing loss can be provided.

Figure 11:
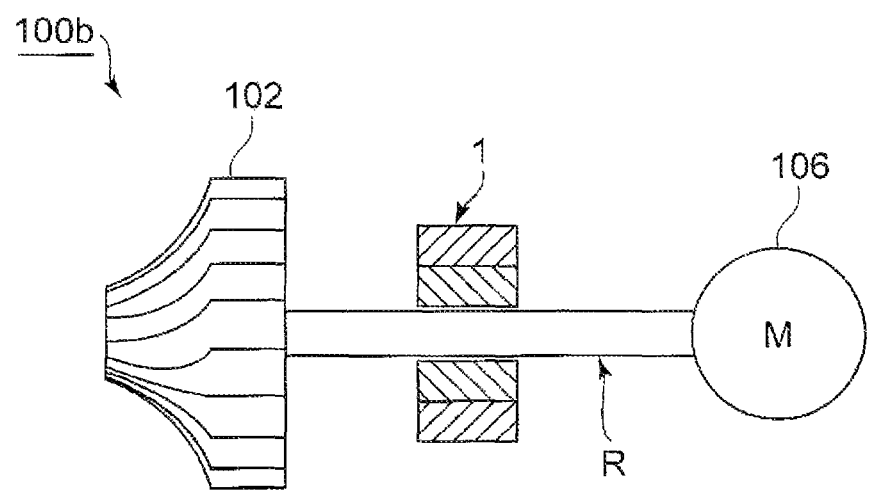
FIG. 11 is a schematic view of an embodiment of a supercharger including the floating bush bearing device according to the present invention.

The supercharger 100 according to the present invention is not limited to the turbocharger 100a described above. As shown in FIG. 11, an electric supercharger 100b may be formed that includes an electric motor 106 instead of the turbine rotor 104. Here, the compressor rotor 102 is driven when the rotation shaft R is rotated by the electric motor 106.

The preferred embodiment of the present invention are described above. However, the present invention is not limited to the embodiments described above, and various modifications may be made without departing from the object of the present invention.

INDUSTRIAL APPLICABILITY

At least one embodiment of the present invention is suitably used, as a floating bush bearing device that rotatably supports a rotation shaft, in a small supercharger mounted in an automobile engine for example.

REFERENCE SIGNS LIST 1, 1a to 1e floating bush bearing device
10 bearing housing
10a inner circumferential surface of bearing housing
12 housing side oil supply hole
14a, 14b recess portion
16 oil groove
20 floating bush
20a circumferential surface of floating bush inner
20b outer circumferential surface of floating bush
20A, 20B arc portion
22 bush side oil supply hole
24 circumference direction groove
26a, 26b partial groove
27a, 28a groove portion
100 supercharger
100a turbocharger
100b electric supercharger
102 compressor rotor
104 turbine rotor
106 electric motor

The invention claimed is:

1. A floating bush bearing device which rotatably supports a rotation shaft, the floating bush bearing device comprising:
a bearing housing;
a floating bush rotatably disposed between the rotation shaft and an inner circumferential surface of the bearing housing, in the bearing housing; and
a bush side oil supply hole which is formed through the floating bush and is capable of supplying lubricating oil between the rotation shaft and the inner circumferential surface of the floating bush, wherein
the inner circumferential surface of the floating bush has a non-circular shape so that a gap portion is formed between the rotation shaft and the inner circumferential surface of the floating bush regardless of relative positions of the rotation shaft and the inner circumferential surface of the floating bush, a clearance formed by the gap portion being different depending on the relative positions of the rotation shaft and the inner circumferential surface of the floating bush,
the bush side oil supply hole communicates with the gap portion, and
recess portions, having different areas, are respectively formed on a load direction side of the rotation shaft and a side opposite to the load direction side, in the inner circumferential surface of the bearing housing.

2. The floating bush bearing device according to claim 1, wherein the inner circumferential surface of the floating bush has a multi-arc shape, formed by combining a plurality of arcs with different center points, or has an elliptical shape.

3. The floating bush bearing device according to claim 2, wherein
recess portions, having different areas, are respectively formed on a load direction side of the rotation shaft and a side opposite to the load direction side, in the inner circumferential surface of the bearing housing, and
one of the recess portions with a larger area communicates with a housing side oil supply hole which is formed through the bearing housing and is capable of supplying lubricating oil between an outer circumferential surface of the floating bush and the inner circumferential surface of the bearing housing.

4. The floating bush bearing device according to claim 2, wherein a plurality of partial grooves are formed in the outer circumferential surface of the floating bush, and the bush side oil supply hole communicates with the partial holes.

5. The floating bush bearing device according to claim 1, wherein
one of the recess portions with a larger area communicates with a housing side oil supply hole which is formed through the bearing housing and is capable of supplying lubricating oil between an outer circumferential surface of the floating bush and the inner circumferential surface of the bearing housing.

6. The floating bush bearing device according to claim 5, wherein an oil groove is formed in the inner circumferential surface of the bearing housing, the oil groove connecting between the two recess portions respectively formed on the load direction side of the rotation shaft and the side opposite to the load direction side.

7. The floating bush bearing device according to claim 6, wherein the housing side oil supply hole communicates with a first recess portion formed on the side opposite to the load direction side of the rotation shaft in the inner circumferential surface of the bearing housing.

8. The floating bush bearing device according to claim 6, wherein the housing side oil supply hole communicates with a second recess portion on the load direction side of the rotation shaft in the inner circumferential surface of the bearing housing.

9. The floating bush bearing device according to claim 6, wherein a circumference direction groove, extending along a circumference direction, is formed in the outer circumferential surface of the floating bush.

10. The floating bush bearing device according to claim 5, wherein the housing side oil supply hole communicates with a first recess portion formed on the side opposite to the load direction side of the rotation shaft in the inner circumferential surface of the bearing housing.

11. The floating bush bearing device according to claim 10, wherein a circumference direction groove, extending along a circumference direction, is formed in the outer circumferential surface of the floating bush.

12. The floating bush bearing device according to claim 5, wherein the housing side oil supply hole communicates with a second recess portion on the load direction side of the rotation shaft in the inner circumferential surface of the bearing housing.

13. The floating bush bearing device according to claim 12, wherein a circumference direction groove, extending along a circumference direction, is formed in the outer circumferential surface of the floating bush.

14. The floating bush bearing device according to claim 5, wherein a circumference direction groove, extending along a circumference direction, is formed in the outer circumferential surface of the floating bush.

15. The floating bush bearing device according to claim 5, wherein a plurality of partial grooves are formed in the outer circumferential surface of the floating bush, and the bush side oil supply hole communicates with the partial holes.

16. The floating bush bearing device according to claim 1, wherein a circumference direction groove, extending along a circumference direction, is formed in the outer circumferential surface of the floating bush.

17. The floating bush bearing device according to claim 1, wherein a plurality of partial grooves are formed in the outer circumferential surface of the floating bush, and the bush side oil supply hole communicates with the partial grooves.

18. The floating bush bearing device according to claim 17, wherein
the partial grooves have a V shape in a plan view formed by two groove portions intersecting with each other, each of two groove portions extending in different directions inclined with respect to an axial direction, and which have an opening side on a rotation direction side of the floating bush, and
the bush side oil supply hole communicates with an intersecting portion between the two groove portions.

19. A supercharger comprising:
a rotation shaft;
a compressor rotor coupled to one end portion of the rotation shaft; and
the floating bush bearing device which rotatably supports the rotation shaft according to claim 1.

20. A floating bush bearing device which rotatably supports a rotation shaft, the floating bush bearing device, comprising:
a bearing housing;
a floating bush rotatably disposed between the rotation shaft and an inner circumferential surface of the bearing housing, in the bearing housing; and
a bush side oil supply hole which is formed through the floating bush and supplies lubricating oil between the rotation shaft and the inner circumferential surface of the floating bush,
wherein
the inner circumferential surface of the floating bush has a non-circular shape so that a gap portion is formed between the rotation shaft and the inner circumferential surface of the floating bush regardless of relative positions of the rotation shaft and the inner circumferential surface of the floating bush, a clearance formed by the gap being different depending on the relative positions of the rotation shaft and the inner circumferential surface of the floating bush,
the bush side oil supply hole communicates with the gap portion,
an outer circumferential surface of the floating bush has a non-circular shape so that a second gap portion is formed between the inner circumferential surface of the bearing housing and the outer circumferential surface of the floating bush regardless of relative positions of the inner circumferential surface of the bearing housing and the outer circumferential surface of the floating bush, a clearance formed by the second gap being different depending on the relative positions of the inner circumferential surface of the bearing housing and the outer circumferential surface of the floating bush, and
the bush side oil supply hole is in communication with the gap portion formed between the rotation shaft and the inner circumferential surface of the floating bush and the second gap portion formed between the inner circumferential surface of the bearing housing and the outer circumferential surface of the floating bush.

* * * * *